UNITED STATES PATENT OFFICE.

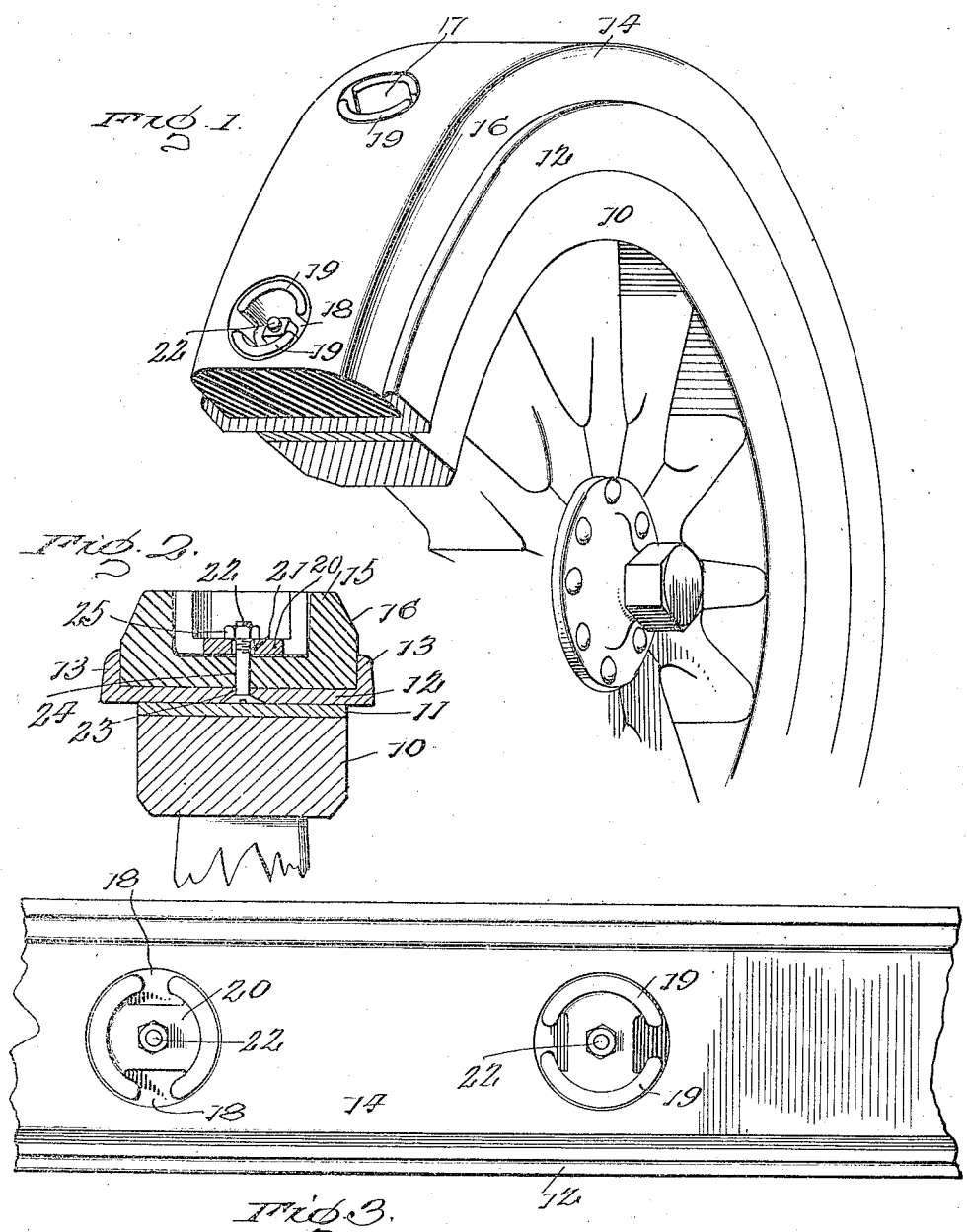

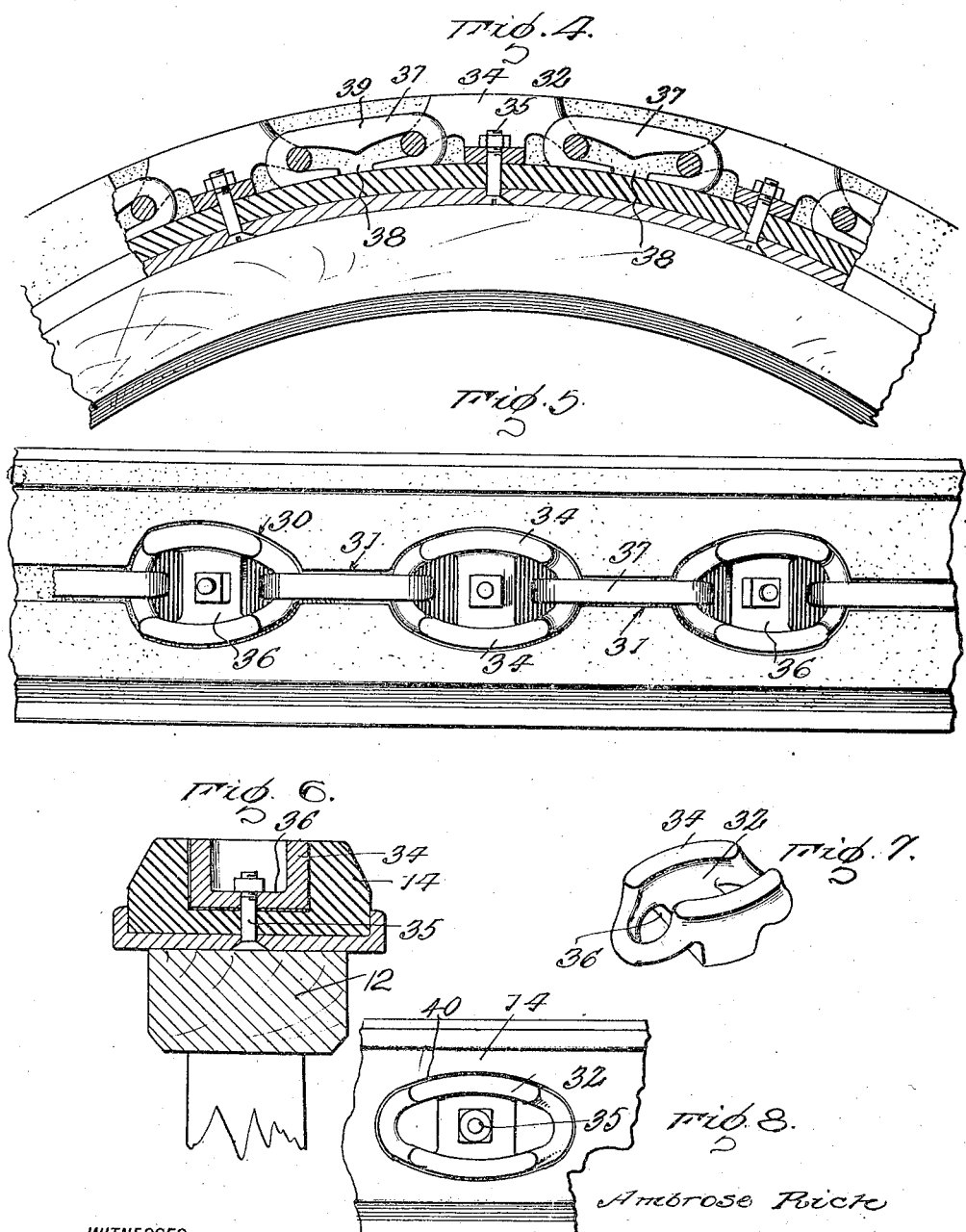

AMBROSE RICH, OF STAMFORD, CONNECTICUT.

ANTISKID DEVICE.

1,335,460.     Specification of Letters Patent.    Patented Mar. 30, 1920.

Application filed May 20, 1919. Serial No. 298,422.

*To all whom it may concern:*

Be it known that I, AMBROSE RICH, a citizen of the United States, residing at Stamford, in the county of Fairfield and State of Connecticut, have invented certain new and useful Improvements in Antiskid Devices, of which the following is a specification.

This invention has relation to tires for motor vehicles, and has for an object to provide a tire which includes a body of rubber having means arranged upon its surface of a more rigid and harder material, designed to engage in and secure a firmer grip upon the road bed than would be afforded by the rubber tread alone and thereby reduce and prevent skidding or sliding of the wheel upon a slippery pavement.

Another object of the invention is to provide a tire having the characteristics above set forth but comprising more specifically a rubber body having recesses in its surfaces and said recesses provided with cups, links or other suitably formed objects of a durable nature, designed, when engaging the road bed during rotation of the wheel to afford great tractive qualities to the wheel, and reduce skidding and slipping without injuring the road bed.

In addition to the foregoing, this invention comprehends improvements in the details of construction and arrangement of parts, to be hereinafter described and particularly set forth in the appended claims.

In the accompanying drawings in which similar and corresponding parts are designated by the same characters of reference throughout the several views in which they appear, Figure 1 is a fragmentary view in perspective of a tire embodying my improvements.

Fig. 2 is a view thereof in transverse section.

Fig. 3, is a view of a development into a plane of a portion of tire tread.

Fig. 4 is a fragmentary view in side elevation, partly in section of a modified form of my invention.

Fig. 5 is a view of a development into a plane of a portion of a different tire tread.

Fig. 6 is a view thereof in transverse section.

Fig. 7 is a view in perspective of one of the links, and

Fig. 8 is a view of a development into a plane of a portion of a still further modified form of tire tread.

With reference to Figs. 1–3 of the drawings, 10 indicates the felly of a vehicle wheel and 11 a steel band encircling the same. My improved tire comprises an annular rim 12 of steel and of channel formation having radial and outwardly extending end flanges 13. The body 14 is of rubber and encircles the rim, being inclosed between the flanges and preferebly integral throughout. The tread surface 15 is straight transversely although the edges of the tire body may be beveled if desired as at 16. A plurality of circular recesses 17 are formed in the tread surface and extend radially for more than one-half the thickness of the tire body, although the depth is optional and may vary in practice. Carefully fitted in each recess is an object of metal, hard rubber or other material which may be termed either a link or a cup since in appearance it resembles both objects bearing those names, but for the sake of clarity it will be termed a cup when used in connection with the form of the invention under discussion, and later as a link. It is cylindrical in form and is divided longitudinally at diametrically opposite points 18 to define opposed arcuate gripping members 19, so termed because of their function which is to grip or engage the road bed. The cup includes a diametrical connecting portion 20 which connects the inner ends of the arcuate members 19, and said portion is apertured as at 21 to receive a stem, bolt or pin 22 which extends through an opening 23 in the rim 12 and also through an opening 24 in the tire body. A nut 25 is applied to the projecting end of the bolt and thereby serves to retain the cup in place. It will be observed that the cup may slide loosely upon the bolt. If desired a strip 26 of metal may be located in the bottom of each recess upon which the cups may rest to prevent injury to the tire body.

The theory of operation is that during travel of the vehicle the broad surface of the tread 15 will bear upon the road bed and the tire body will thus resiliently support the vehicle and afford all the traction requisite under ordinary conditions. As the wheel rolls, the edges or ends of the arcuate portions 19 of the cups will be brought into contact with the road bed perpendicularly relative thereto and then withdrawn from such engagement, the cups sinking slightly into the tire body and also partly into the road bed, thus increasing somewhat the traction of the wheel. However, when extraordinary conditions occur, such as when the vehicle skids sidewise or is compelled to travel up a steep incline, requiring extra tractive qualities in either case, it will be observed that under the lateral distortion of the tire body in the first instance, or the increased power applied to the wheels in the second case, the edges of the cups are permitted to engage in the road bed more deeply and the additional traction required of the wheel is thus automatically manifested and supplied. To insure action of the cups in both lateral and circumferential sliding of the wheel, I may arrange them so that the gripping members 19 will extend alternately transversely and longitudinally of the tire. It will be observed that as each cup engages the road bed it will be moved inwardly coincidently with the compression of the tire body at the point of contact, sliding freely upon the sleeve or bolt 22 which remains rigid and extends radially at all times. To this end each rim opening 23 is countersunk to receive the broad head of the bolt.

I have illustrated in Figs. 4-7 a modified form of my invention which comprises the rim 12 as before and tire body 14, the latter however having a plurality of circumferentially arranged elliptical recesses 30, connected by channel recesses 31. Seated in each recess 30 is an object 32 which may be termed a link comprising an elliptical portion 33 having opposite sides thickened as at 34 to form gripping members flush with the surface of the tread. These thickened portions are disposed longitudinally of the tire. Each link is held in place by means of a bolt 35 which corresponds to the bolt 22 above described, is mounted in the same way and passes through an opening in a connecting portion 36 which is formed with each link and connects the thickened portions thereof. The links are then connected to each other by means of links 37 which are seated in the channel recesses 31, each link 37 having one side open as at 38 to permit said links to be readily engaged around the ends of the links 32. The outer edges of the links 37 are below the tread surface and each link is preferably thickened at that point as at 39.

It will be apparent that when the vehicle is carrying an ordinary load the tire body will not be compressed sufficiently to bring the links 37 into contact with the road bed, but the thickened portions 34 of the links 32 will afford sufficient friction with the road bed to provide all the traction required. However, under a heavy load the links 37 will bear upon the road bed and thus afford additional rigid support, to relieve the tire body of strain, prevent side slipping of the wheels and greatly increase the traction.

In Fig. 8 I have shown a method of utilizing the principles above set forth in which the tire body 14 is formed with an elliptical recess 40 in which one of the links 32 is seated, being mounted and held in the manner described above but without the use of the connecting links 37.

From the foregoing it will be seen that I have provided a tire especially adapted for trucks and commercial vehicles since its construction may be varied to adapt the tire to vehicles of from the lightest to the heaviest weight; at the same time providing for good traction at all times, being self compensating as it is, to permit the tire body to alone support the weight of the vehicle when lightly loaded and to automatically bring into play one after another of its durable elements, as the links 32 and 37 to assure sufficient traction as the vehicle becomes more heavily loaded. By reason of this self compensation and proper traction qualities, skidding is prevented under any conditions. Many tires have been devised heretofore for use on trucks, but in each instance the construction was such as to bruise the tire internally to a greater extent than the ordinary wear on the tire of the road bed. It will be apparent that each cup and link in my tire is guided in such a manner as to move with the tire body and it thus becomes impossible for the tire body to grind against the durable elements, as in cross chains, for instance which are used at the present time. In addition to the durability of my tire, it will be apparent that no damage to the road bed is possible with it as in the case of the present types of non-skid devices, all of which project above the tread of the tire and act to simultaneously bruise the tire body and damage the road bed. My tire is furthermore especially adapted for use on ice and snow since the tendency to both circumferential and lateral slipping is provided against. Other uses and advantages will readily occur to those skilled in the art to which this invention appertains.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:

1. A tire including a body of rubber having its surface recessed, and an object seated in each recess comprising a cup having its sides divided longitudinally to provide opposed road gripping members.

2. A tire including a recessed body, a stem and cup in each recess, said cup having an opening to receive the stem and its side divided longitudinally, and means on the stem to prevent dislodgment of the cup.

3. A tire including a metallic rim, a tire body mounted thereon having its surface recessed, a stem extending rigidly from the rim into each recess, an object in each recess having opposed portions flush with the surface of the tire body and apertured connecting portions to receive the stems and means applied to the stems to secure the objects in place.

4. A tire including a tire body having its outer surface formed with recesses alternate of which are elliptical, a series of connected articulated elements alternate of which are elliptical and seated in said elliptical recesses, and means anchoring the elliptical elements.

5. A non-skid device for tires including a pair of opposed arcuate members connected at points intermediate their ends.

In testimony whereof I affix my signature in presence of a witness.

AMBROSE RICH.

Witness:
WM. ZEAMAN.